June 21, 1960     W. H. FRICK     2,941,856
MOBILE CARRIER AND DISPENSER IN COMBINATION
WITH A FOOD SERVICE UNIT
Filed Jan. 19, 1953     3 Sheets-Sheet 1
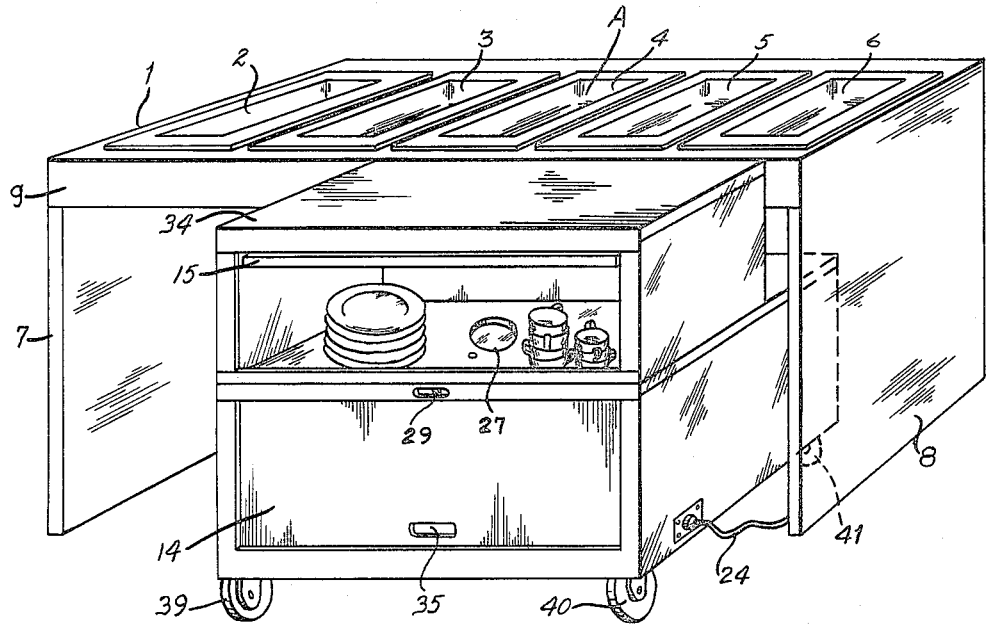
Fig. 1
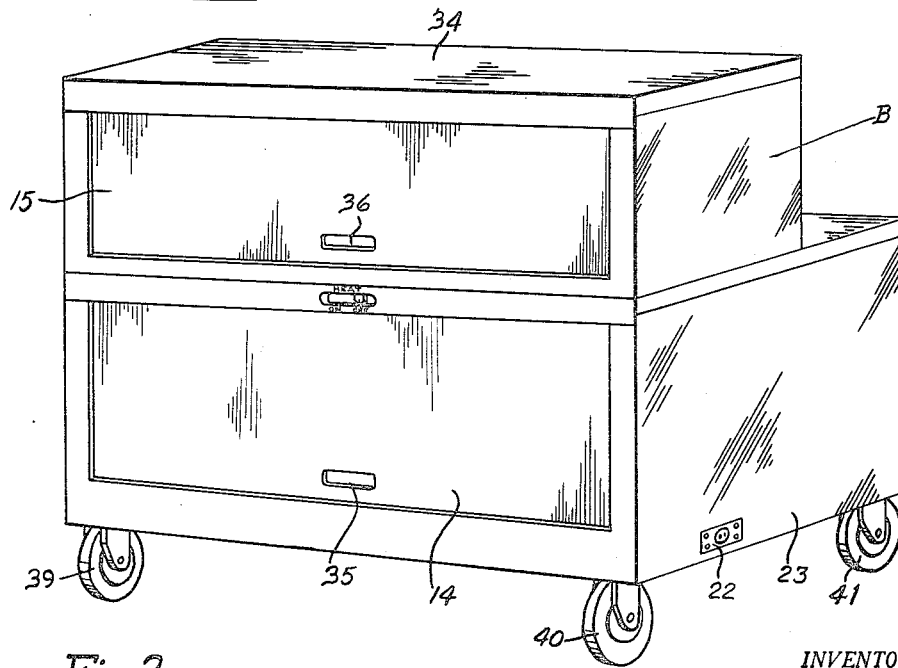
Fig. 2
INVENTOR.
WILLIAM H. FRICK
BY
ATTORNEY

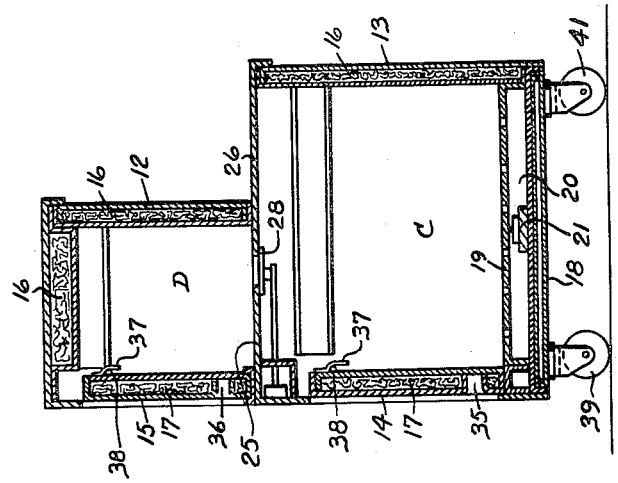
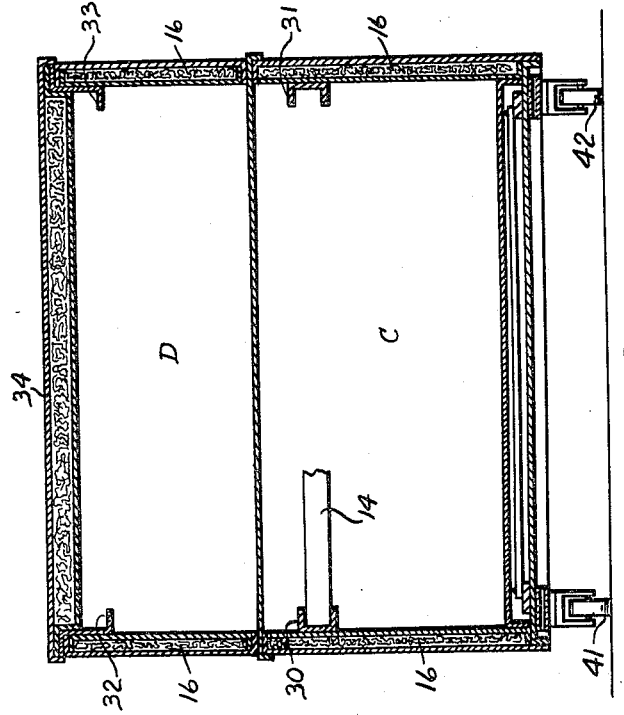

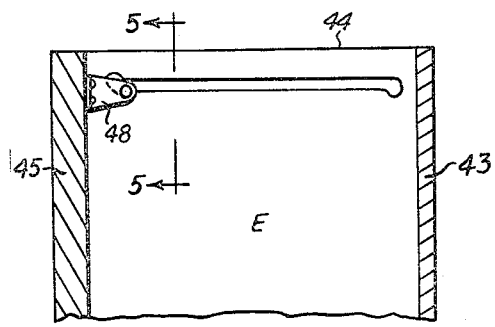
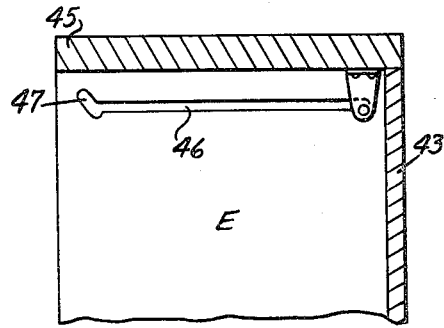
Fig. 5    Fig. 6
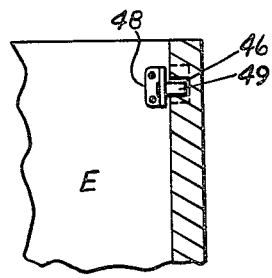
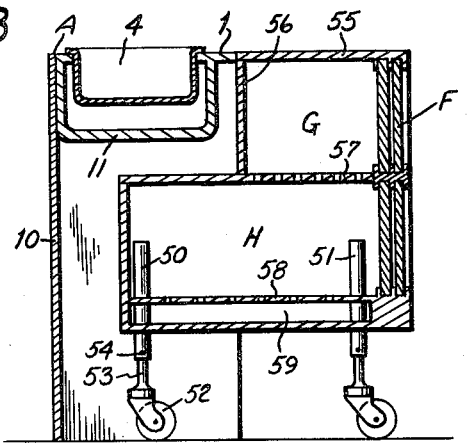
Fig. 7    Fig. 8
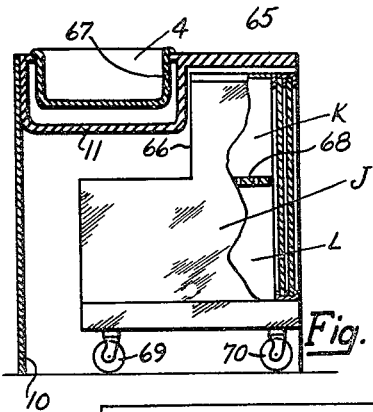
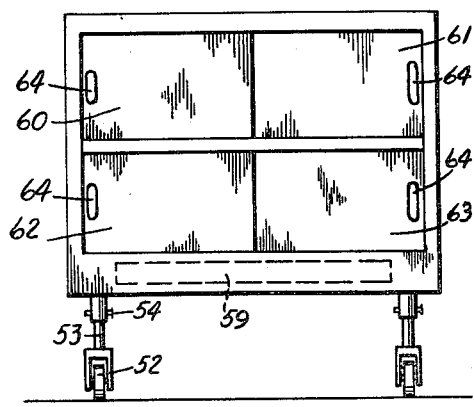
Fig. 9
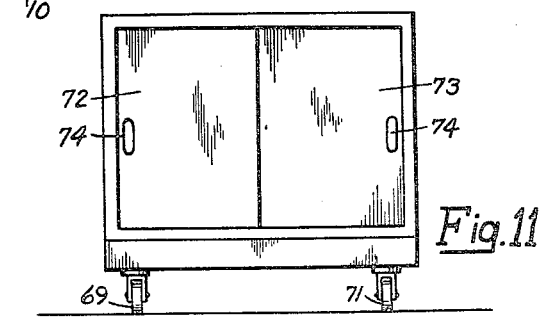
Fig. 10
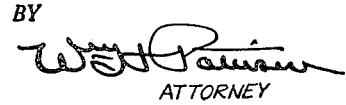
Fig. 11
INVENTOR.
WILLIAM H. FRICK
BY
ATTORNEY

United States Patent Office 2,941,856
Patented June 21, 1960

2,941,856

MOBILE CARRIER AND DISPENSER IN COMBINATION WITH A FOOD SERVICE UNIT

William H. Frick, 1805 Union Commerce Bldg., Cleveland, Ohio

Filed Jan. 19, 1953, Ser. No. 331,995

2 Claims. (Cl. 312—277)

This invention relates to a mobile carrier and dispenser in combination with a food service unit and although it can be otherwise utilized the arrangement is primarily intended for use in hospitals, hotels, restaurants, industrial cafeterias, cafeterias, clubs, hospital central service kitchens, or similar or like establishments.

The arrangement has been conceived to simplify the serving of food and the provision at the service unit of chinaware and a supplemental counter.

The numerous objects and advantages of the invention as well as novel mechanical constructions will appear from the following description when read in the light of the accompanying drawings.

In the drawings:

Fig. 1 is a perspective view of the combination, the upper door of the mobile carrier and dispenser being shown in an open position.

Fig. 2 is a perspective view of the mobile carrier and dispenser, all the doors thereof being closed.

Fig. 3 is a transverse vertical sectional view of Fig. 2.

Fig. 4 is a longitudinal sectional view of Fig. 2.

Fig. 5 is a fragmentary vertical sectional view showing the modified door arrangement for the upper compartment of the mobile carrier and dispenser, the door being in a closed position.

Fig. 6 is a view similar to Fig. 5, the door being shown in an open position.

Fig. 7 is a fragmentary view partly in vertical section showing the supporting arrangement for the door of Fig. 5.

Fig. 8 is a vertical sectional view through a modified form of the invention.

Fig. 9 is a view in front elevation of the mobile carrier and dispenser of Fig. 8.

Fig. 10 is a vertical sectional view of a still further modified form of the invention.

Fig. 11 is a view in front elevation of the mobile carrier and dispenser appearing in Fig. 10.

Referring to Figs. 1 to 4 inclusive, the food service unit is designated as an entirety by A and in general terms comprises a counter 1 having therein a plurality of food reception or carrying pans or trays 2, 3, 4, 5 and 6. The unit is provided with end walls 7 and 8 which serve as supporting legs for the counter. The counter has a very narrow depending rear wall or edge 9. The counter is preferably, although not necessarily, provided with a front wall which does not appear in Fig. 1 but can be seen in Figs. 8 and 10 where it is designated as 10. In the referred to two figures of the drawings the construction of the counter is illustrated where it will be seen that each of the trays is supported on the counter top and depends into a larger tray 11 which forms a reservoir.

Food serving units can be either heated or chilled. They can be steam tables or they can be chill tables by the provision of the adequate arrangement in the pan reception pan or reservoir 11. It will be obvious that steam or hot water could be circulated in the reservoir or that refrigerating coils could be placed therein, or that chilled water can be circulated therein, dependent upon whether it is desired for the food in the trays to be kept warm or cooled.

It will be seen that in all forms of the invention the rear end of the food service unit is open, although in the Fig. 1 arrangement the unit has the very short depending wall 9 heretofore referred to.

The mobile carrier and dispenser is designated as an entirety by B and comprises a lower compartment C upon which is superposed an upper and much smaller compartment D. The compartment D is of less depth than the compartment C with the result that the rear wall 12 of the compartment is inset a very considerable distance from the rear wall 13 of the lower compartment. The fronts of both compartments are flush, that is lie in the same plane. The lower compartment is provided with a door 14 and the upper compartment with a door 15.

As it is intended that either or both of the compartments be heated or chilled, as desired, all of the walls of the compartments are double walls filled with insulation 16 and the doors 14 and 15 are double walled and insulated as at 17.

The lower compartment is provided above its bottom 18 with a perforated floor 19 spaced from the bottom to provide a chamber 20 in which can be positioned either a heating or cooling apparatus. In the present instance an electrical heating unit 21 is illustrated, which is suitably wired to a socket 22 on the outer end wall 23 of the lower compartment so that electric current can be brought to the unit conveniently by a plugged electrical conductor 24, as is illustrated in Fig. 1.

As it might be desirable to heat or cool the lower compartment C without similarly conditioning the upper compartment D, the bottom 25 of the upper compartment, which in reality is the top 26 of the lower compartment, is provided with an opening 27 controlled by a damper 28 which is operable from the front of the carrier by manual manipulation of a suitable handle 29.

The doors of both compartments are constructed to swing upwardly and then to slide rearwardly beneath the tops of the compartments. To this end the lower compartment is provided on its inner side or end walls with guideways 30 and 31 for the reception of the lower door, as illustrated in Fig. 4, while the upper compartment on its inner side or end walls is provided with oppositely positioned horizontally disposed flanges 32 and 33 which serve as supports along which can slide the upper door 15 until it is in the position illustrated in Fig. 1 of the drawings where it will be seen that it lies parallel to and directly beneath the top 34 of the compartment. Each door is provided with a finger grip or hold and these are designated 35 and 36. To prevent the doors from being pulled too far outwardly and to guide the doors in their pivotal swinging movement each of the doors at each of its ends is provided with a depending finger 37, see Fig. 3, which engages a pin 38 which extends inwardly from the side or end wall of its respective compartment.

To render the carrier mobile it is provided at each of its corners with a wheel. These wheels are designated 39, 40, 41 and 42 and are preferably, although not necessarily, swivel or caster wheels.

The provision at the serving unit of chinaware and the tableware or eating facilities or equipment for patrons, ordinarily poses a considerable work problem. With the present arrangement the mobile carrier and dispenser can be loaded in the kitchen or in the department where these articles are washed, and can be wheeled to the service unit and positioned as illustrated in Fig. 1 of the drawings. As soon as a carrier and dispenser is emptied, a substitute or loaded one can be wheeled into place while the empty carrier and dispenser can be returned to the kitchen for reloading.

The manner of utilization of the mobile carrier and dispenser is illustrated in Fig. 1 of the drawings, from which it will be seen that the rear extending end of the lower compartment extends beneath the service unit counter while the rear wall 12 of the upper compartment abuts the service counter depending flange or wall 9. The carrier and dispenser is proportioned so that its top 34 is level with the service unit top or counter so that this top 34 provides a supplemental counter or shelf, which has been found to be very useful.

Under some conditions and in some establishments it might prove desirable to remove from the upper compartment D china or utensils from the top rather than from the front through the door opening. To provide for operation in this manner the top 34 is made freely removable as it is removably supported upon the upper end of the side and rear walls of the upper compartment.

The upper compartment of the mobile carrier can be of the modified construction appearing in Figs. 5 to 7 inclusive of the drawings. Here the upper compartment of the carrier is designated as E and as having a rear wall 43 and an open top 44. In this arrangement the door 45 of the compartment is intended to swing up and to slide back or rearwardly, as illustrated in Fig. 6, to provide a closure for the upper open end 44 of the compartment, and at the same time serve as a supplemental counter or shelf adjacent the food service unit. To enable the free movement referred to, the inner faces of the end walls of the compartment are provided with oppositely positioned grooves 46 shaped at their forward or outer ends as at 47. The door at each of its ends and adjacent its upper edge is provided with a rearwardly extending bracket 48 provided with a pin 49 slidable in its respective groove 46. The groove ends 47 provide for the swinging movements of the door and serve as a stop for the outward movement of the door and also as a support for the door.

The arrangement illustrated in Figs. 8 and 9 does not differ greatly from that appearing in Figs. 1 to 4 of the drawings. The differences are entirely in the mobile carrier and dispenser as the serving unit is similar to that previously described and therefore carries like reference numerals.

In respect to food service units already installed, it is entirely possible that the counter heights of the units might be different from the height of the mobile carrier and dispenser B. Accordingly the mobile carrier and dispenser F is made adjustable for height. This is accomplished by placing in each of the four corners of the carrier and dispenser a vertically disposed hollow tube, two of which are illustrated and designated 50 and 51. Each caster wheel 52 is provided with an extending stem 53 which is telescopically received by the particular tube with which it is associated. Each stem is along its length provided with spaced apart holes for the reception of a pin 54 which extends through the tube. By this arrangement the carrier and dispenser can be raised and lowered until the top 55 of the upper compartment G is level with the top of the service unit counter 1.

The upper compartment G and the lower compartment H are substantially similar to those previously described so that the rear wall 56 of the upper compartment abuts the rear edge of the service unit counter while the rear end of the lower compartment extends below the counter. The bottom 57 of the upper compartment and the floor 58 of the lower compartment are perforated so that they can receive either heat or chilled air from the chamber 59 beneath the lower compartment floor. A heating or cooling unit would be disposed in this chamber in accordance with desires.

The upper compartment G is provided with a pair of sliding doors 60 and 61 and the lower compartment is provided with similar doors 62 and 63. These doors can be conveniently manipulated by their finger-holds 64 to provide access to either side of either compartment.

The arrangement illustrated in Figs. 10 and 11 has been devised for a slightly different type of food service unit in that the counter or top of this unit extends rearwardly to provide along the rear edge of the unit a service counter or shelf 65.

In combination with such a service unit it is intended that the mobile carrier and dispenser J be moved into a position below said counter or shelf 65 until the rear wall 66 of the upper compartment K of the unit is in abutment or substantial abutment with the rear wall 67 of the pan or reservoir 11. This carrier and dispenser has, like those previously described, upper and lower compartments which are designated K and L. The bottom 68 of the upper compartment is perforated while the lower end of the lower compartment is constructed as illustrated in Fig. 6. The unit is rendered mobile by swivel wheels at its corners, three of which appear and are designated 69, 70 and 71.

The door arrangement for this carrier is slightly different in that only two sliding doors 72 and 73 are provided. Manipulation of these doors by the finger-holds 74 provides simultaneous access to either end of both the upper and lower compartments.

From the foregoing it will be seen that the arrangement provides a mobile carrier dispenser designed to fit at the rear of the service unit counter and to extend partly beneath and that the mobile dispenser reduces the heretofore necessary handling of plates and dishes to keep them heated or chilled. With the present mobile dispenser the usual cabinets or shelves beneath the service unit counter can be dispensed with and work is reduced and saved in respect to plates and dishes, and the amount of handling of plates and dishes is reduced thus reducing breakage. The arrangement also simplifies cleaning under the service unit counter. The mobile dispenser provides a working counter or shelf at the proper and convenient working height. The foregoing advantages will be understood and it is recognized that service counters ordinarily have stationary shelving to which dishes and plates must be hauled from the kitchen or dish washing department and then stacked on the fixed shelving. This calls for additional handling, which means not only work but may cause excessive breakage. The doors of the mobile carrier prevent dishes and plates falling therefrom and becoming broken when they are being transported to the service unit counter.

What I claim is:

1. For use with a food service unit comprising a counter for supporting food containers and carriers, a wheeled carrier dispenser having therein upper and lower compartments, the upper end of the upper compartment having an open upper end, individual doors in the front of the carrier for providing access to the upper and lower compartments thereof, the door for the upper compartment being mounted to swing upwardly into a horizontal plane and moved rearwardly to cover the open upper end of the upper compartment, said door being of the same size and configuration as the open upper end of the upper compartment to completely cover the same, the upper and outer face of the upper compartment door when positioned above and covering the upper open end of the upper compartment lying in the same plane as the upper face of the counter of the food service unit with which the carrier is adapted to be associated, and the rear wall of the upper compartment adapted to be moved in abutting relationship with the rear of the food service unit counter whereby the door cover of the upper compartment provides a supplemental counter adjacent the food service unit counter.

2. A construction as defined in claim 1 wherein, the wheel support for the carrier comprises a swivelly mounted caster below each corner of the lower carrier compartment, each caster being provided with an elongated upwardly extending stem, an elongated hollow tube at each corner of the carrier lower compartment, said caster stems being telescopically received by said tubes, and means to selectively adjust the telescopic relation between the caster stems and said tubes to selectively vertically raise and lower the carrier to align the door closure top of the upper compartment with food service unit counters of various heights.

References Cited in the file of this patent

UNITED STATES PATENTS

| Number | Name | Date |
|---|---|---|
| 1,729,401 | Richards | Sept. 24, 1929 |
| 1,735,078 | Hance | Nov. 13, 1929 |
| 1,837,372 | Rocke | Dec. 22, 1931 |
| 1,955,203 | Salomon | Apr. 17, 1934 |
| 1,964,805 | Barnes | July 3, 1934 |
| 2,196,035 | Shaw | Apr. 2, 1940 |
| 2,309,513 | Kramer | Jan. 26, 1943 |
| 2,419,766 | Domash | Apr. 29, 1947 |
| 2,432,397 | Earle | Dec. 9, 1947 |
| 2,589,358 | Feiertag | Mar. 18, 1952 |